United States Patent
Dillon et al.

(10) Patent No.: US 10,465,324 B1
(45) Date of Patent: Nov. 5, 2019

(54) METHOD FOR DETECTING A LOW WATER LEVEL IN A WASHING MACHINE APPLIANCE

(71) Applicant: Haier US Appliance Solutions, Inc., Wilmington, DE (US)

(72) Inventors: Nicholas Matthew Dillon, Louisville, KY (US); Ryan Ellis Leonard, Louisville, KY (US); Stephen Edward Hettinger, Louisville, KY (US); Ryan James Scheckelhoff, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/993,685

(22) Filed: May 31, 2018

(51) Int. Cl.
| | |
|---|---|
| *D06F 37/00* | (2006.01) |
| *D06F 39/00* | (2006.01) |
| *D06F 33/02* | (2006.01) |
| *G05B 19/042* | (2006.01) |
| *D06F 21/06* | (2006.01) |
| *D06F 39/08* | (2006.01) |

(52) U.S. Cl.
CPC ............ *D06F 33/02* (2013.01); *D06F 21/06* (2013.01); *D06F 37/00* (2013.01); *D06F 39/00* (2013.01); *D06F 39/087* (2013.01); *G05B 19/042* (2013.01); *G05B 2219/2633* (2013.01); *Y02B 40/50* (2013.01)

(58) Field of Classification Search
CPC ......... Y02B 40/50; Y02B 40/52; D06F 33/00; D06F 33/02; D06F 39/00; D06F 39/087; D06F 2204/086; G05B 19/042; G05B 2219/2633
See application file for complete search history.

(56) References Cited

U.S. PATENT DOCUMENTS

| | | | |
|---|---|---|---|
| 3,086,836 A | 4/1963 | Ohmann | |
| 3,478,373 A | 11/1969 | McBride et al. | |
| 3,478,374 A | 11/1969 | McBride et al. | |
| 3,498,090 A | 3/1970 | Mason | |
| 4,503,575 A | 3/1985 | Knoop et al. | |
| 4,697,293 A | 10/1987 | Knoop | |
| 5,720,064 A * | 2/1998 | Koo | D06F 39/087 8/158 |
| 5,768,728 A * | 6/1998 | Harwood | D06F 39/003 68/12.04 |
| 6,023,950 A * | 2/2000 | Battistella | D06F 39/003 68/12.04 |

(Continued)

FOREIGN PATENT DOCUMENTS

WO    WO2009068391 A1    6/2009

*Primary Examiner* — Ronald D Hartman, Jr.

(74) *Attorney, Agent, or Firm* — Dority & Manning, PA (57) ABSTRACT

A washing machine appliance includes a wash tub defining a wash chamber for receipt of a load of articles for washing and a water control valve for regulating a flow of water from a water supply into the wash chamber. A controller is configured for detecting a low water level in the wash chamber, e.g., due to a low water supply pressure, by obtaining a target volume and a fill volume; obtaining an underfill limit based at least in part on the fill volume; obtaining a tub water level after attempting to fill to the target volume; obtaining a new fill level if the tub water level is less than the underfill limit; and filling the wash tub to the new fill level.

20 Claims, 6 Drawing Sheets

(56) References Cited

U.S. PATENT DOCUMENTS

| | | | |
|---|---|---|---|
| 8,719,986 B2 | 5/2014 | Kim et al. | |
| 9,816,222 B2 | 11/2017 | Obregon | |
| 10,161,074 B2* | 12/2018 | Hombroek | D06F 33/02 |
| 2004/0211228 A1* | 10/2004 | Nishio | D06F 25/00 |
| | | | 68/12.05 |
| 2006/0010611 A1* | 1/2006 | Snow | D06F 33/02 |
| | | | 8/158 |
| 2008/0028801 A1* | 2/2008 | Czyzewski | D06F 35/006 |
| | | | 68/12.05 |
| 2008/0201867 A1* | 8/2008 | Bang | D06F 33/02 |
| | | | 8/158 |
| 2009/0241271 A1* | 10/2009 | La Belle | D06F 39/003 |
| | | | 8/159 |
| 2010/0011514 A1* | 1/2010 | Park | D06F 33/02 |
| | | | 8/159 |
| 2011/0100068 A1* | 5/2011 | Simsek | D06F 37/02 |
| | | | 68/19 |
| 2012/0024016 A1* | 2/2012 | Dunn | D06F 35/007 |
| | | | 68/12.27 |
| 2013/0239336 A1* | 9/2013 | Kim | D06F 33/02 |
| | | | 8/137 |
| 2014/0174547 A1* | 6/2014 | Joo | D06F 39/087 |
| | | | 137/2 |
| 2016/0010257 A1* | 1/2016 | Kim | D06F 17/06 |
| | | | 8/137 |
| 2016/0053422 A1* | 2/2016 | Im | D06F 39/085 |
| | | | 8/137 |
| 2016/0215435 A1* | 7/2016 | Gasparini | D06F 39/06 |
| 2018/0030636 A1* | 2/2018 | Park | D06F 39/00 |
| 2018/0087202 A1* | 3/2018 | Choi | D06F 17/06 |
| 2018/0237971 A1* | 8/2018 | Kim | D06F 37/42 |
| 2019/0120725 A1* | 4/2019 | Yoon | G01M 99/005 |

* cited by examiner

METHOD FOR DETECTING A LOW WATER LEVEL IN A WASHING MACHINE APPLIANCE

FIELD OF THE INVENTION

The present subject matter relates generally to washing machine appliances, and more particularly to methods for detecting a low water level in washing machine appliances.

BACKGROUND OF THE INVENTION

Washing machine appliances generally include a wash tub for containing water or wash fluid, e.g., water and detergent, bleach, and/or other wash additives. A wash basket is rotatably mounted within the wash tub and defines a wash chamber for receipt of articles for washing, and an agitation element is rotatably mounted within the wash basket. Washing machine appliances are typically equipped to operate in one or more modes or cycles, such as wash, rinse, and spin cycles. For example, during a wash or rinse cycle, the wash fluid is directed into the wash tub in order to wash and/or rinse articles within the wash chamber. In addition, the wash basket and/or the agitation element can rotate at various speeds to agitate or impart motion to articles within the wash chamber, to wring wash fluid from articles within the wash chamber, etc.

Conventional washing machine appliances use a water fill algorithm that fills the wash tub by opening a water fill valve for a predetermined amount of time determined as a function of an average flow rate and the desired fill level. For example, if the average flow rate is five gallons per minute and the desired fill level is 15 gallons, the controller would open the water fill valve for exactly three minutes. However, washing machine appliances are frequently installed in locations with a low water inlet pressure, which can result in a lower average flow rate. Conventional fill algorithms do not factor in this reduction in flow rate, so opening the water fill valve for an amount of time calculated assuming the average flow rate will result in less water in the wash tub and decreased wash performance.

Accordingly, a washing machine appliance including features and control algorithms for an improved water fill process would be useful. More specifically, a water fill control algorithm for a washing machine appliance that accurately and efficiently supplies the desired amount of water would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a washing machine appliance is provided including a cabinet and a wash tub positioned within the cabinet and defining a wash chamber for receipt of a load of articles for washing. A water control valve regulates a flow of water from a water supply into the wash chamber and a controller is operably coupled to the water control valve. The controller is configured for obtaining a target volume, operating a valve to fill the wash tub to the target volume, obtaining a tub water level, obtaining a fill volume, obtaining an underfill limit based at least in part on the fill volume, determining that the tub water level is less than the underfill limit, obtaining a new fill level based at least on part on the target volume in response to determining that the tub water level is less than the underfill limit, and filling the wash tub to the new fill level.

In another exemplary embodiment, a method for filling a washing machine appliance is provided. The washing machine appliance includes a wash tub and a water control valve for regulating a flow of water into the wash tub. The method includes obtaining a target volume, operating a valve to fill the wash tub to the target volume, obtaining a tub water level, obtaining a fill volume, obtaining an underfill limit based at least in part on the fill volume, determining that the tub water level is less than the underfill limit, obtaining a new fill level based at least on part on the target volume in response to determining that the tub water level is less than the underfill limit, and filling the wash tub to the new fill level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Figure 1:
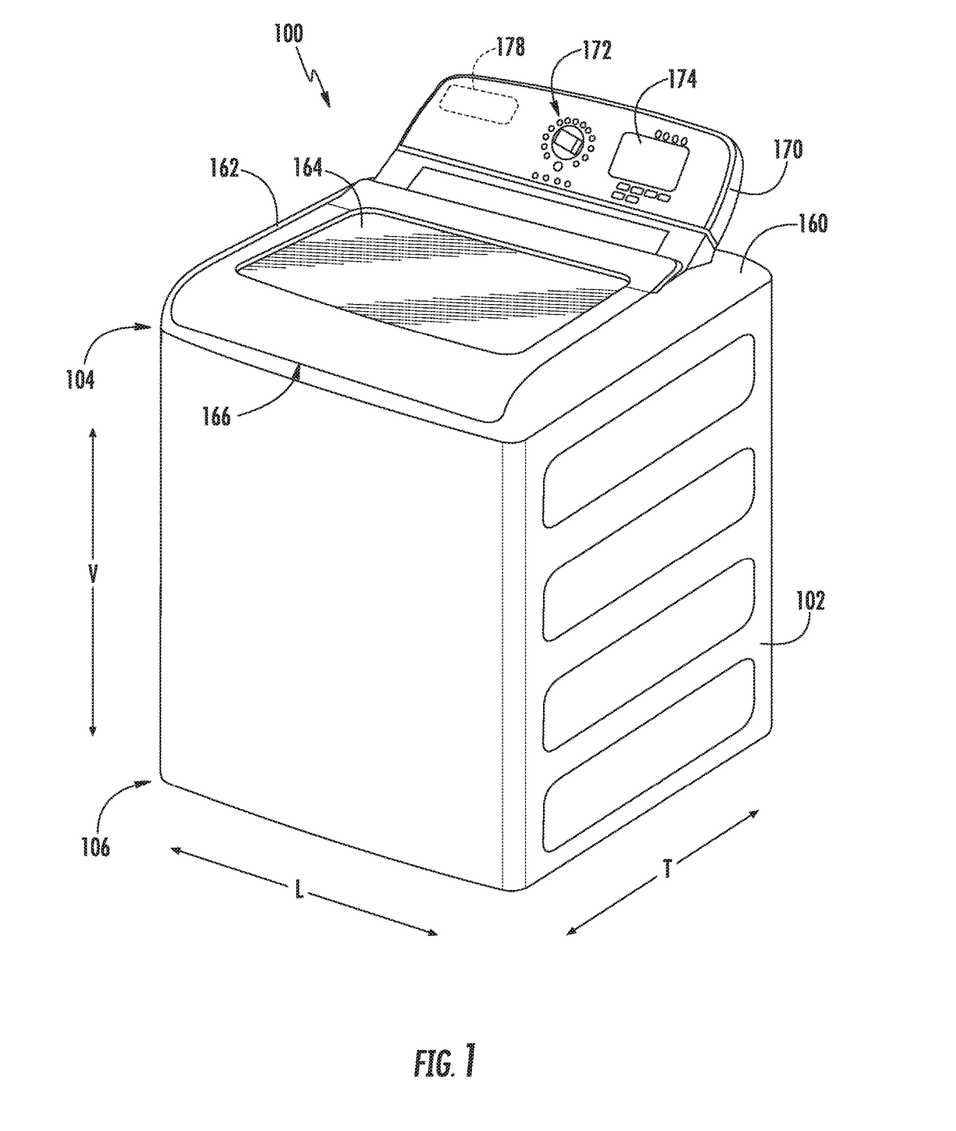
FIG. 1 provides a perspective view of a washing machine appliance according to an exemplary embodiment of the present subject matter with a door of the exemplary washing machine appliance shown in a closed position.
Figure 2:
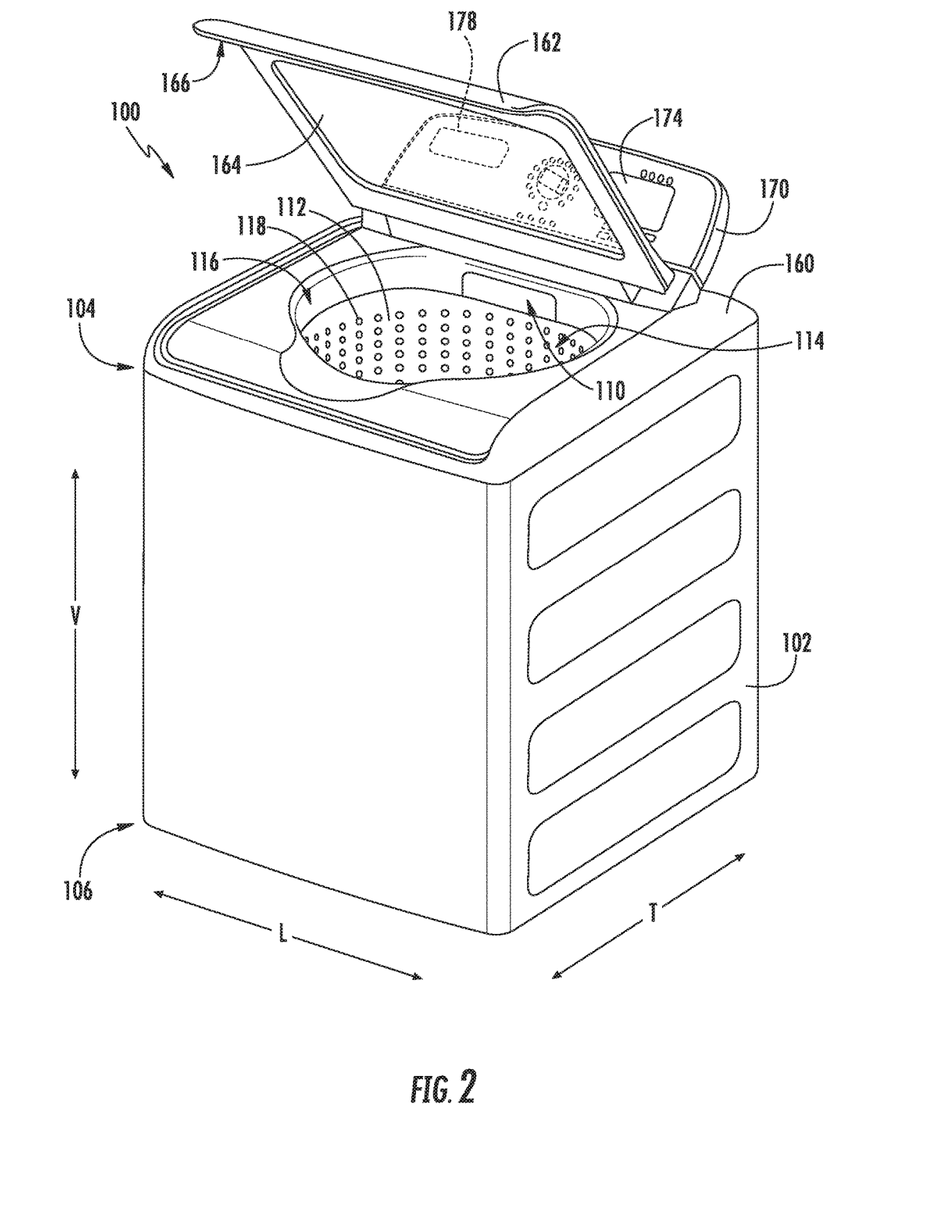
FIG. 2 provides a perspective view of the exemplary washing machine appliance of FIG. 1 with the door of the exemplary washing machine appliance shown in an open position.
Figure 3:
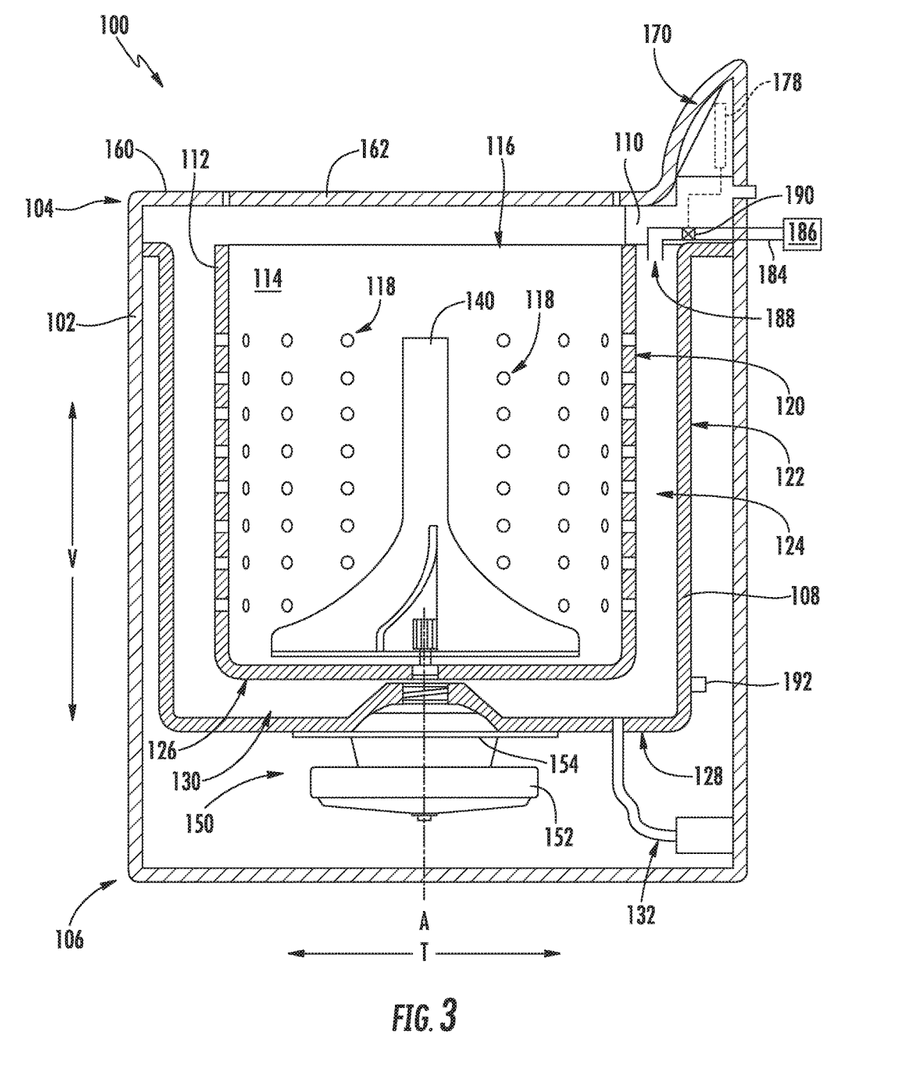
FIG. 3 provides a side, cross sectional view of the exemplary washing machine appliance of FIG. 1 according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V. As best shown in FIG. 3, a wash tub 108 is positioned within cabinet 102 for holding wash and rinse fluids for agitation. Washing machine appliance 100 further includes a primary dispenser 110 (FIG. 2) for dispensing wash fluid into wash tub 108. The term "wash fluid" refers to a liquid used for washing and/or rinsing articles during an operating cycle and may include any combination of water, detergent, fabric softener, bleach, and other wash additives or treatments. In addition, washing machine appliance 100 includes a wash basket 112 that is movably disposed and rotatably mounted in wash tub 108. Wash basket 112 generally defines a wash chamber 114 including an opening 116 for receipt of articles for washing. Wash basket 112 further defines a plurality of perforations 118 to facilitate fluid communication between an interior of wash basket 112 and wash tub 108.

More specifically, wash basket 112 is spaced apart from wash tub 108 to define a space for wash fluid to escape wash chamber 114. In this regard, a cylindrical basket sidewall 120 is spaced apart from a tub sidewall 122 to define an annulus 124 therebetween. Similarly, a basket bottom 126 is spaced apart from a tub bottom 128 to define a sump 130 therebetween. During a spin cycle, wash fluid within articles of clothing and within wash chamber 114 is urged through perforations 118 into annulus 124. The wash fluid then travels down annulus 124 and collects in sump 130. Washing machine appliance 100 further includes a pump assembly 132 (FIG. 3) that is located beneath wash tub 108 and wash basket 112 for gravity assisted flow when draining wash tub 108.

An impeller or agitation element 140 (FIG. 3), such as a vane agitator, impeller, auger, oscillatory basket mechanism, or some combination thereof is disposed in wash basket 112 to impart an oscillatory motion to articles and liquid in wash basket 112. More specifically, agitation element 140 extends into wash basket and assists agitation of articles disposed within wash basket 112 during operation of washing machine appliance 100, e.g., to facilitate improved cleaning. In different embodiments, agitation element 140 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 140 and wash basket 112 are oriented to rotate about a drive axis A (which is substantially parallel to vertical direction V).

Referring still to FIG. 3, washing machine appliance 100 includes a motor assembly 150 in mechanical communication with wash basket 112 to selectively rotate wash basket 112 (e.g., during an agitation or a rinse cycle of washing machine appliance 100). In addition, motor assembly 150 may also be in mechanical communication with agitation element 140. In this manner, motor assembly 150 may be configured for selectively rotating or oscillating wash basket 112 and/or agitation element 140 during various operating cycles of washing machine appliance 100.

According to exemplary embodiments, motor assembly 150 may generally include one or more of a drive motor 152, a transmission assembly 154, and/or a clutch assembly for engaging and disengaging wash basket 112 and/or agitation element 140. According to the illustrated embodiment, drive motor 152 is a brushless DC electric motor, e.g., a pancake motor. However, according to alternative embodiments, drive motor 152 may be any other suitable type or configuration of motor. For example, drive motor 152 may be an AC motor, an induction motor, a permanent magnet synchronous motor, or any other suitable type of motor.

Cabinet 102 of washing machine appliance 100 has a top panel 160. Top panel 160 defines an opening (FIG. 2) that coincides with opening 116 of wash basket 112 to permit a user access to wash basket 112. Washing machine appliance 100 further includes a door 162 which is rotatably mounted to top panel 160 to permit selective access to opening 116. In particular, door 162 selectively rotates between the closed position (as shown in FIGS. 1 and 3) and the open position (as shown in FIG. 2). In the closed position, door 162 inhibits access to wash basket 112. Conversely, in the open position, a user can access wash basket 112. A window 164 in door 162 permits viewing of wash basket 112 when door 162 is in the closed position, e.g., during operation of washing machine appliance 100. Door 162 also includes a handle 166 that, e.g., a user may pull and/or lift when opening and closing door 162. Further, although door 162 is illustrated as mounted to top panel 160, door 162 may alternatively be mounted to cabinet 102 or any other suitable support.

A control panel 170 with at least one input selector 172 (FIG. 1) extends from top panel 160. Control panel 170 and input selector 172 collectively form a user interface input for operator selection of machine cycles and features. A display 174 of control panel 170 indicates selected features, operation mode, a countdown timer, and/or other items of interest to appliance users regarding operation.

Operation of washing machine appliance 100 is controlled by a controller or processing device 178 that is operatively coupled to control panel 170 for user manipulation to select washing machine cycles and features. In response to user manipulation of control panel 170, controller 178 operates the various components of washing machine appliance 100 to execute selected machine cycles and features. As described in more detail below with respect to FIG. 4, controller 178 may include a memory and microprocessor, such as a general or special purpose microprocessor operable to execute programming instructions or micro-control code associated with methods described herein. Alternatively, controller 178 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 170 and other components of washing machine appliance 100 may be in communication with controller 178 via one or more signal lines or shared communication busses.

Figure 4:
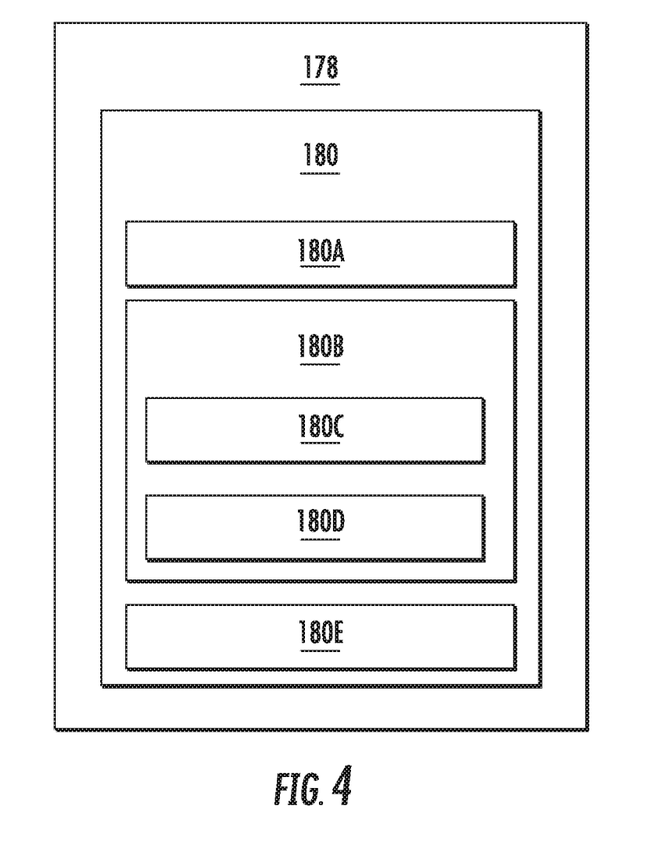
FIG. 4 depicts certain components of a controller according to example embodiments of the present subject matter.

FIG. 4 depicts certain components of controller 178 according to example embodiments of the present disclosure. Controller 178 can include one or more computing device(s) 180 which may be used to implement methods as described herein. Computing device(s) 180 can include one or more processor(s) 180A and one or more memory device(s) 180B. The one or more processor(s) 180A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 180B can include one or more non-transitory computer-readable storage medium(s), such as RAM, ROM, EEPROM, EPROM, flash memory devices, magnetic disks, etc., and/or combinations thereof.

The memory device(s) 180B can include one or more computer-readable media and can store information accessible by the one or more processor(s) 180A, including instructions 180C that can be executed by the one or more processor(s) 180A. For instance, the memory device(s) 180B can store instructions 180C for running one or more software applications, displaying a user interface, receiving user input, processing user input, etc. In some implementations, the instructions 180C can be executed by the one or more processor(s) 180A to cause the one or more processor(s) 180A to perform operations, e.g., such as one or more portions of methods described herein. The instructions 180C can be software written in any suitable programming language or can be implemented in hardware. Additionally, and/or alternatively, the instructions 180C can be executed in logically and/or virtually separate threads on processor(s) 180A.

The one or more memory device(s) 180B can also store data 180D that can be retrieved, manipulated, created, or stored by the one or more processor(s) 180A. The data 180D can include, for instance, data to facilitate performance of methods described herein. The data 180D can be stored in one or more database(s). The one or more database(s) can be connected to controller 178 by a high bandwidth LAN or WAN, or can also be connected to controller through network(s) (not shown). The one or more database(s) can be split up so that they are located in multiple locales. In some implementations, the data 180D can be received from another device.

The computing device(s) 180 can also include a communication module or interface 180E used to communicate with one or more other component(s) of controller 178 or washing machine appliance 100 over the network(s). The communication interface 180E can include any suitable components for interfacing with one or more network(s), including for example, transmitters, receivers, ports, controllers, antennas, or other suitable components.

During operation of washing machine appliance 100, laundry items are loaded into wash basket 112 through opening 116, and washing operation is initiated through operator manipulation of input selectors 172. Wash basket 112 is filled with water and detergent and/or other fluid additives via primary dispenser 110. One or more valves can be controlled by washing machine appliance 100 to provide for filling wash tub 108 and wash basket 112 to the appropriate level for the amount of articles being washed and/or rinsed. By way of example for a wash mode, once wash basket 112 is properly filled with fluid, the contents of wash basket 112 can be agitated (e.g., with an impeller as discussed previously) for washing of laundry items in wash basket 112.

More specifically, referring briefly to FIG. 3, a water fill process will be described according to an exemplary embodiment. As illustrated, washing machine appliance 100 includes a water supply conduit 184 that provides fluid communication between a water supply source 186 (such as a municipal water supply) and a discharge nozzle 188 for directing a flow of water into wash chamber 114. In addition, washing machine appliance 100 includes a water fill valve or water control valve 190 which is operably coupled to water supply conduit 184 and communicatively coupled to controller 178. In this manner, controller 178 may regulate the operation of water control valve 190 to regulate the amount of water within wash tub 108. In addition, washing machine appliance 100 may include one or more pressure sensors 192 for detecting the amount of water and or clothes within wash tub 108. For example, pressure sensor 192 may be operably coupled to tub bottom 128 or tub sidewall 122 for detecting the weight of wash tub 108, which controller 178 may use to determine a height of water in wash chamber 114.

After wash tub 108 is filled and the agitation phase of the wash cycle is completed, wash basket 112 can be drained, e.g., by drain pump assembly 132. Laundry articles can then be rinsed by again adding fluid to wash basket 112 depending on the specifics of the cleaning cycle selected by a user. The impeller or agitation element 140 may again provide agitation within wash basket 112. One or more spin cycles may also be used as part of the cleaning process. In particular, a spin cycle may be applied after the wash cycle and/or after the rinse cycle in order to wring wash fluid from the articles being washed. During a spin cycle, wash basket 112 is rotated at relatively high speeds to help wring fluid from the laundry articles through perforations 118. After articles disposed in wash basket 112 are cleaned and/or washed, the user can remove the articles from wash basket 112, e.g., by reaching into wash basket 112 through opening 116.

Notably, as explained briefly above, washing machine appliance 100 may be fluidly coupled to a water supply source 186 which has a lower than average water inlet pressure. Because a lower water inlet pressure can result in a lower average flow rate, conventional fill algorithms often would dispense less water than needed for a given cycle because they do not factor in this reduction in flow rate. As a result, wash performance is decreased and user satisfaction is negatively affected. Aspects of the present subject matter are directed to control algorithms and methods for detecting and correcting a low water condition within washing machine appliance 100.

Now that the construction of washing machine appliance 100 and the configuration of controller 178 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as horizontal axis washing machine appliances. In exemplary embodiments, the various method steps as disclosed herein may be performed by controller 178 or a separate, dedicated controller.

Figure 5:
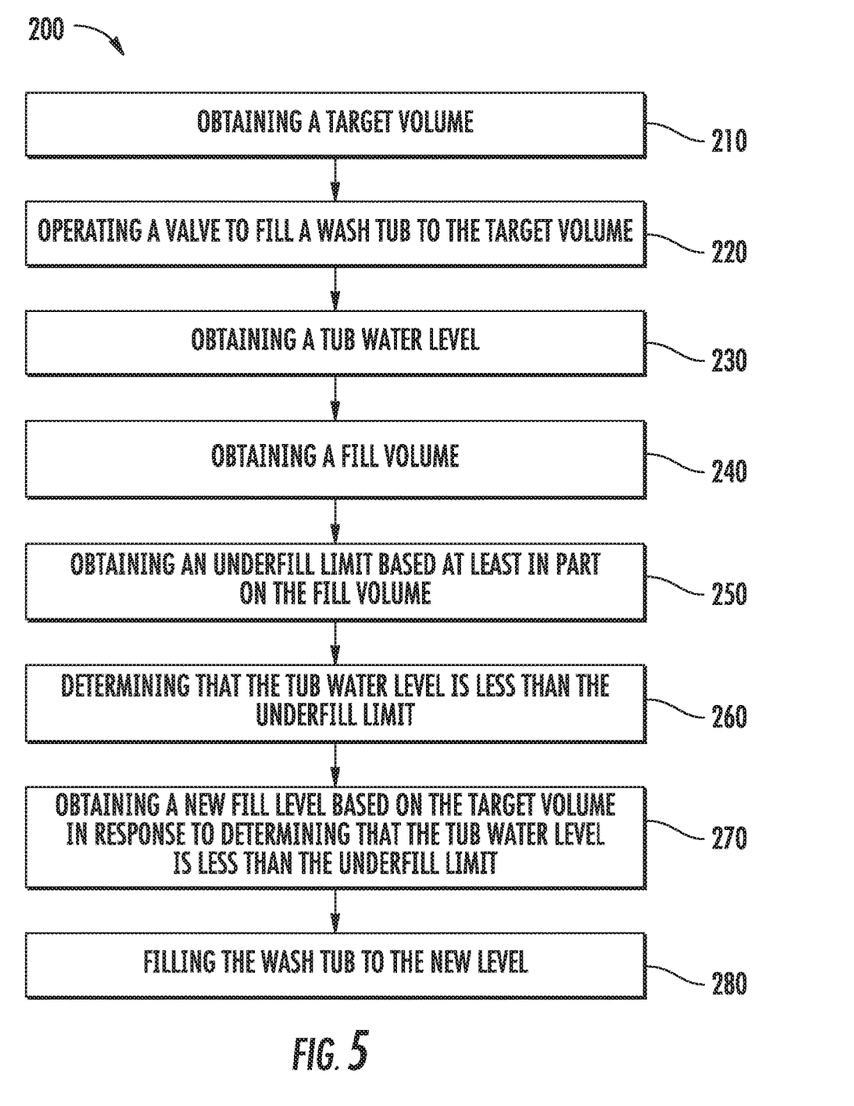
FIG. 5 illustrates a method for controlling a washing machine appliance in accordance with one embodiment of the present disclosure

Referring now to FIG. 5, method 200 includes, at step 210, obtaining a target volume. As used herein, "target volume" ($V_{T_a}$), is used generally to refer to the precise volume of water that is determined by the washing machine appliance to be optimum for a given wash load. According to an exemplary embodiment, the target volume may be determined by an auto load sensing procedure performed by that washing machine appliance. In this regard, for example, the washing machine may perform a dry load sense procedure to determine a size of the load and a wet load sense procedure to determine a type of the load. Based on the size and type of the wash load, the controller may be configured for calculating or otherwise determining the target volume. According to alternative embodiments, any other suitable means for determining the target volume may be used, e.g., based on user input, load selection and size parameters, etc.

Method 200 further includes, at step 220, operating a valve (such as water control valve 190) to fill the wash tub to the target volume. In this manner, for example, a water control valve may be opened to perform a time-based fill procedure assuming an average water flow rate. Notably, in lower water pressure installations, wash tub might end up with less than the target volume. Thus, method 200 includes steps for estimating the amount of water in the tub.

For example, method 200 includes, at step 230, obtaining a tub water level, e.g., as a check on the actual water level in the tub. The tub water level (which may be identified herein as $lvl_{tub}$) is generally an actual measure of the amount of water in the wash tub, typically measured in inches of water. In this regard, for example, a pressure sensor (such as pressure sensor 192) may be coupled to the wash tub and may correlate the weight of the wash tub to the water level in the wash tub.

Step 240 includes obtaining a fill volume ($V_{Fill}$), which in certain circumstances is substantially equivalent to the target volume ($V_{Targ}$). However, this is not always the case. For example, the washing machine starts with a target volume ($V_{Targ}$) and then tries to fill to that target volume. The volume of water that the washer thinks it has in it is considered the fill volume ($V_{Fill}$). Notably, as described briefly above, this fill volume ($V_{Fill}$) is determined, for example, based on the amount of time the water valve is open and the estimated flow rate. During a wet load sense procedure, which happens before the target volume ($V_{Targ}$) is obtained, the goal is for the unit to fill until it reaches a specific pressure level from the pressure sensor. More absorbent loads will take a long time to reach the level and less absorbent loads will not take very long to reach the level. For example, when a load is more absorbent and the inlet pressure is very low, the valve will be on for a long time to reach the pressure level in the tub. This will lead to a very high fill volume ($V_{Fill}$). Then, after this wet load sense procedure, a target volume ($V_{Targ}$) is output. Normally, the target volume ($V_{Targ}$) will be higher than the current fill volume ($V_{Fill}$) and the unit will go into its normal fill mode and fill up to the target volume ($V_{Targ}$) making the two equal. But, in this case with an absorbent load and low inlet pressure, the target volume ($V_{Targ}$) that is output by this procedure may be a number that is less than the fill volume ($V_{Fill}$) since the valves may have been on for a very long time.

At step 250, method 200 includes obtaining an underfill limit ($lvl_{limit}$) based at least in part on the fill volume ($V_{Fill}$). The underfill limit ($lvl_{limit}$) is generally the threshold fill level (in inches of water) below which method 200 adds more water to wash tub to achieve better wash performance. The underfill limit ($lvl_{limit}$) may be set by the user or manufacturer for a given load size or type, may be determined empirically, or may be calculated in any other suitable manner. For example, according to the exemplary embodiment, obtaining the underfill limit ($lvl_{limit}$) comprises using the following equation:

$$lvl_{limit} = \alpha \cdot V_{Fill} - \beta$$

In the above equation, the underfill limit ($lvl_{limit}$) is calculated by the appliance controller as a function of the fill volume ($V_{Fill}$), a fill volume coefficient ($\alpha$), and a minimum fill level intercept coefficient ($\beta$). As mentioned above, these coefficients ($\alpha$, $\beta$) may be empirically determined, for example, as a function of the size and configuration of the wash tub, wash basket, agitation element, etc. For example, according to an exemplary embodiment, the fill volume coefficient ($\alpha$) is substantially equivalent to 0.4611 and the minimum fill level intercept coefficient ($\beta$) is substantially equivalent to 1.6137. It should be appreciated that as used herein, terms of approximation, such as "approximately," "substantially," or "about," refer to being within a ten percent margin of error.

At step 260, method 200 includes determining that the tub water level ($lvl_{tub}$) is less than the underfill limit ($lvl_{limit}$). If this condition is not satisfied, there may be a sufficient amount of water in the tub and the washing cycle may proceed, e.g., to the agitation cycle. However, if this condition is satisfied, method 200 includes steps for adding additional water to reach the desired amount of water, thereby compensating for the lower inlet water flow rate.

Specifically, step 270 includes obtaining a new fill level ($lvl_{fill}$) based at least on part on the target volume ($V_{Targ}$) in response to determining that the tub water level ($lvl_{tub}$) is less than the underfill limit ($lvl_{limit}$). The new fill level ($lvl_{fill}$) is generally the optimum fill level (in inches of water) which washing machine appliance may fill the wash tub, compensating for the lower inlet flow rate. The new fill level ($lvl_{fill}$) may be set by the user or manufacturer for a given load size or type, may be determined empirically, or may be calculated in any other suitable manner. For example, according to the exemplary embodiment, obtaining the new fill level ($lvl_{fill}$) comprises using the following equation:

$$lvl_{fill} = \gamma \cdot V_{Targ} - \theta$$

In the above equation, the new fill level ($lvl_{fill}$) is calculated by the appliance controller as a function of the target volume ($V_{Targ}$), a target volume coefficient ($\gamma$), and a minimum target level intercept coefficient ($\theta$). These coefficients ($\gamma$, $\theta$) may be empirically determined, for example, as a function of the size and configuration of the wash tub, wash basket, agitation element, etc. For example, according to an exemplary embodiment, the target volume coefficient ($\gamma$) and the minimum target level intercept coefficient ($\theta$) are substantially equivalent to 0.4611, though any other suitable coefficient(s) may be used according to alternative embodiments.

Method 200 further includes, at step 280, filling the wash tub to the new fill level ($lvl_{fill}$). For example, the controller may close a water control fill valve when a pressure sensor attached to the wash tub detects that the level of water in the wash tub (e.g., in inches of water) is equivalent to the new fill level ($lvl_{fill}$). After the water is supplied to the desired level, the washing machine cycle may continue as normal, e.g., by entering an agitation phase.

Although the discussion herein refers to method 200 for operating washing machine appliance 100, one skilled in the art will appreciate that the features and configurations described may be used for operating other washing machine appliances in other manners. For example, method 200 may be used to operate a horizontal axis washing machine appliance, the target and fill volume coefficient ($\alpha$, $\gamma$) and the minimum level intercept coefficients ($\beta$, $\theta$) may vary, and other means for measuring water level could be used. Other variations and modifications of the exemplary embodiment described below are possible, and such variations are contemplated as within the scope of the present subject matter.

FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using washing machine appliance 100 as an example, it should be appreciated that these methods may be applied to the operation of any suitable washing machine appliance.

Figure 6:
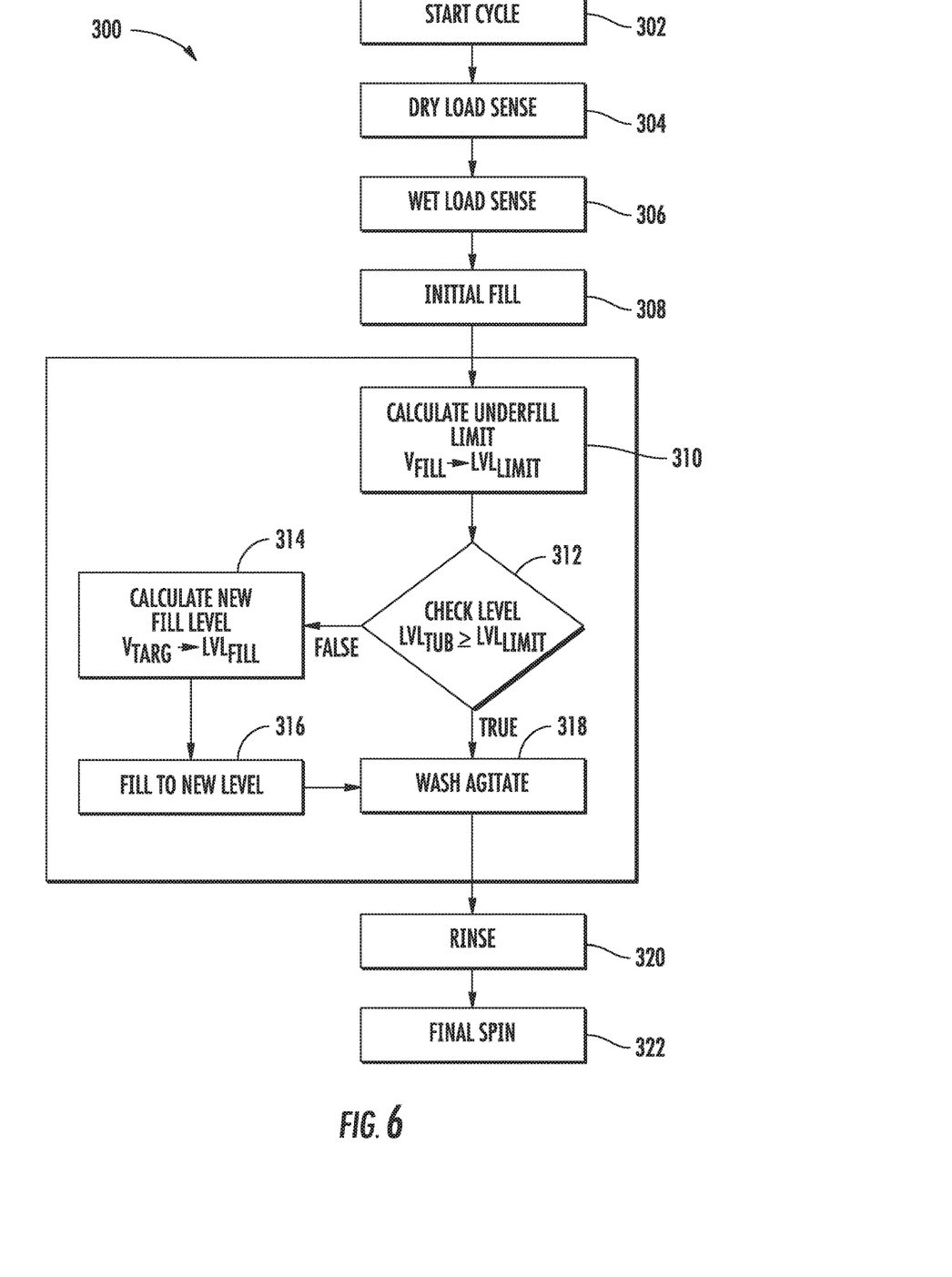
FIG. 6 illustrates an exemplary decision tree or flow diagram of an operating method of the washing machine appliance of FIG. 1 according to an exemplary embodiment of the present subject matter.

Referring now to FIG. 6, an exemplary illustration of the decision making process or control method implemented by controller 178 to perform method 200 is illustrated. It should be appreciated that the flow diagram 300 is intended only to provide a simple illustration of an exemplary control method. The flow diagram 300 is not intended to limit the scope of the present subject matter in any manner.

After the cycle is initiated (302), the controller performs a dry load sense procedure (304) to determine a size of a wash load, e.g., in pounds. For example, controller may use a pressure sensor to detect the load weight after a wash load is added but prior to adding water. The controller may then add some amount of water and perform a wet load sense procedure (306) to determine a type of load, e.g., such as cottons, synthetics, etc. Based on the dry and wet load sense procedures, the controller may determine a target volume (308) and may regulate a water control valve to fill the tub to that target volume. Notably, in the event the inlet water flow rate is lower than average, the actual water in the tub may be less than the target volume. This level of water that the washer thinks it contains is referred to as fill volume.

The controller may then calculate an underfill limit (310), e.g., using an equation as set forth above, e.g., as a function of the fill volume, or using any other suitable method. If the tub water level (e.g., as measured by a tub pressure sensor) is less than the underfill limit (312), the controller may calculate a new fill level (314), e.g., using an equation as set forth above. The controller may then regulate the fill valve to add water until the measured tub water level reaches the new fill level (316). At this point, the amount of water in the tub is sufficient for improved wash performance. Therefore, controller may then complete the operating cycle, e.g., by performing and agitation cycle (318), a rinse cycle (320), and/or a final spin cycle (322). It should be appreciated that the procedure illustrated by diagram 300 may omit certain steps for simplicity of discussion. Variations and modifications to this control method are possible and within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
a cabinet;
a wash tub positioned within the cabinet and defining a wash chamber for receipt of a load of articles for washing;
a water control valve for regulating a flow of water from a water supply into the wash chamber; and
a controller operably coupled to the water control valve, the controller being configured for:
obtaining a target volume;
operating a valve to fill the wash tub to the target volume;
obtaining a tub water level;
obtaining a fill volume;
obtaining an underfill limit based at least in part on the fill volume;
determining that the tub water level is less than the underfill limit;
obtaining a new fill level based at least in part on the target volume in response to determining that the tub water level is less than the underfill limit; and
filling the wash tub to the new fill level.

2. The washing machine appliance of claim 1, wherein obtaining the target volume comprises:
performing a dry load sense procedure to determine a size of the load;
performing a wet load sense procedure to determine a type of the load; and
determining the target volume based on the size and the type of the load.

3. The washing machine appliance of claim 1, wherein obtaining the underfill limit comprises using the following equation:

$$lvl_{limit} = \alpha \cdot V_{Fill} - \beta$$

where: $lvl_{limit}$=the underfill limit;
$\alpha$=a fill volume coefficient;
$V_{Fill}$=the fill volume; and
$\beta$=a minimum fill level intercept coefficient.

4. The washing machine appliance of claim 3, wherein the fill volume coefficient ($\alpha$) is substantially equivalent to 0.4611 and the minimum fill level intercept coefficient ($\beta$) is substantially equivalent to 1.6137.

5. The washing machine appliance of claim 1, comprising:
a pressure sensor operably coupled to the wash tub, and wherein obtaining the tub water level comprises measuring the tub water level using the pressure sensor.

6. The washing machine appliance of claim 5, wherein the pressure sensor is positioned at a sidewall of the wash tub.

7. The washing machine appliance of claim 1, wherein obtaining the new fill level comprises using the following equation:

$$lvl_{fill} = \gamma \cdot V_{Targ} - \theta$$

where: $lvl_{fill}$=the new fill level;
$\gamma$=a target volume coefficient;
$V_{Targ}$=the target volume; and
$\theta$=a minimum target level intercept coefficient.

8. The washing machine appliance of claim 7, wherein the target volume coefficient (γ) and the minimum target level intercept coefficient (θ) are substantially equivalent to 0.4611.

9. The washing machine appliance of claim 1, wherein the underfill limit and the new fill level are measured in inches of water.

10. The washing machine appliance of claim 1, wherein the washing machine appliance is a top load washing machine appliance.

11. A method for filling a washing machine appliance, the washing machine appliance comprising a wash tub and a water control valve for regulating a flow of water into the wash tub, the method comprising:
   obtaining a target volume;
   operating a valve to fill the wash tub to the target volume;
   obtaining a tub water level;
   obtaining a fill volume;
   obtaining an underfill limit based at least in part on the fill volume;
   determining that the tub water level is less than the underfill limit;
   obtaining a new fill level based at least in part on the target volume in response to determining that the tub water level is less than the underfill limit; and
   filling the wash tub to the new fill level.

12. The method of claim 11, wherein obtaining the target volume comprises:
   performing a dry load sense procedure to determine a size of the load;
   performing a wet load sense procedure to determine a type of the load; and
   determining the target volume based on the size and the type of the load.

13. The method of claim 11, wherein obtaining the underfill limit comprises using the following equation:

$$lvl_{limit} = \alpha \cdot V_{Fill} - \beta$$

where: $lvl_{limit}$ = the underfill limit;
   $\alpha$ = a fill volume coefficient;
   $V_{Fill}$ = the fill volume; and
   $\beta$ = a minimum fill level intercept coefficient.

14. The method of claim 13, wherein the fill volume coefficient (α) is substantially equivalent to 0.4611 and the minimum fill level intercept coefficient (β) is substantially equivalent to 1.6137.

15. The method of claim 11, wherein the washing machine appliance comprises:
   a pressure sensor operably coupled to the wash tub, and wherein obtaining the tub water level comprises measuring the tub water level using the pressure sensor.

16. The method of claim 15, wherein the pressure sensor is positioned at a sidewall of the wash tub.

17. The method of claim 11, wherein obtaining the new fill level comprises using the following equation:

$$lvl_{fill} = \gamma \cdot V_{Targ} - \theta$$

where: $lvl_{fill}$ = the new fill level;
   $\gamma$ = a target volume coefficient;
   $V_{Targ}$ = the target volume; and
   $\theta$ = a minimum target level intercept coefficient.

18. The method of claim 17, wherein the target volume coefficient (γ) and the minimum target level intercept coefficient (θ) are substantially equivalent to 0.4611.

19. The method of claim 11, wherein the underfill limit and the new fill level are measured in inches of water.

20. The method of claim 11, wherein the washing machine appliance is a top load washing machine appliance.

* * * * *